(12) United States Patent
Brown, Jr.

(10) Patent No.: US 7,857,178 B2
(45) Date of Patent: Dec. 28, 2010

(54) DEVICE FOR SUPPORTING TELEPHONE HEADPIECES IN AUTOMOBILES

(76) Inventor: Kenneth J. Brown, Jr., 1452 Horseshoe Pike, Glenmoore, PA (US) 19343

( * ) Notice: Subject to any disclaimer, the term of this patent is extended or adjusted under 35 U.S.C. 154(b) by 0 days.

(21) Appl. No.: 11/859,774

(22) Filed: Sep. 23, 2007

(65) Prior Publication Data
US 2008/0078793 A1    Apr. 3, 2008

Related U.S. Application Data

(60) Provisional application No. 60/848,443, filed on Sep. 29, 2006.

(51) Int. Cl.
*B60R 7/04* (2006.01)
*B60R 7/06* (2006.01)

(52) U.S. Cl. .................. 224/483; 224/547; 224/571; 224/929

(58) Field of Classification Search .......... 224/483, 224/279, 276, 442, 277, 929, 930, 197, 547, 224/571
See application file for complete search history.

(56) References Cited

U.S. PATENT DOCUMENTS

| | | | | |
|---|---|---|---|---|
| 4,097,012 A * | 6/1978 | McIntyre | ............... | 248/674 |
| 5,086,958 A * | 2/1992 | Nagy | ............... | 224/544 |
| 5,274,885 A * | 1/1994 | Hellweg | ............... | 24/3.12 |
| 5,484,066 A | 1/1996 | Luisi | | |
| 5,568,549 A | 10/1996 | Wang | | |
| 5,593,124 A * | 1/1997 | Wang | ............... | 248/231.81 |
| 5,620,120 A * | 4/1997 | Tien | ............... | 224/199 |
| 5,979,724 A * | 11/1999 | Loewenthal et al. | ............... | 224/483 |
| 6,036,071 A * | 3/2000 | Hartmann et al. | ............... | 224/547 |
| 6,371,345 B1 * | 4/2002 | Leyden et al. | ............... | 224/553 |
| 6,491,194 B2 | 12/2002 | Marvin | | |
| 6,564,432 B1 | 5/2003 | Kushner | | |
| 7,099,466 B2 | 8/2006 | Walsh | | |
| 7,099,467 B1 | 8/2006 | Rohrbach | | |
| 2004/0040994 A1 * | 3/2004 | Parcelles | ............... | 224/483 |

* cited by examiner

*Primary Examiner*—Justin M Larson
(74) *Attorney, Agent, or Firm*—Allen, Dyer, Doppelt, Milbrath & Gilchrist, P.A.

(57) ABSTRACT

A universal mobile telephone headpiece holder includes a U-shaped receiver member, configured to hold an earpiece, and a generally linear support member that is capable to engage a curved member on a telephone headpiece not having an earpiece to support the headpiece within convenient reach of an operator of an automobile vehicle while the headpiece is not in use. The receiver member can be configured for mounting in different attachment members to be detachable therefrom. The attachment member can be in the form of a clip engagable with an air conditioning vent grille louver or an adhesive member that is simply stuck on a flush surface of the dashboard. Through the universal telephone headpiece holder, the headpiece can be supported at an elevated location to be accessed when the phone rings without searching for the headpiece.

12 Claims, 7 Drawing Sheets

DEVICE FOR SUPPORTING TELEPHONE HEADPIECES IN AUTOMOBILES

CROSS-REFERENCE TO RELATED APPLICATIONS

This application claims domestic priority on U.S. Provisional Patent Application Ser. No. 60/848,443, filed Sep. 29, 2006, the contents of which are incorporated herein by reference.

FIELD OF THE INVENTION

This invention relates to an accessory for use in an automobile to support a headpiece for convenient access and, more particularly, to a universal holder detachably affixed to a surface on the interior of the automobile to support the headpiece of a cellular telephone and other electronic devices.

BACKGROUND OF THE INVENTION

Portable electronic devices, such as cellular telephones, digital music players and other communication devices have enjoyed increased acceptance and a proliferation in usage throughout the population. Often these electronic devices are utilized with a headpiece, particularly cellular telephones and related electronic communication devices. The headpieces come in many different sizes and configurations, including ones mounted on the ear, ones that fit into the ear, and ones that clamp on top of the head of the wearer. When the headpieces are not being utilized, they are typically stored someplace until the headpiece is needed again. When in an automobile, that storage place can be in a cup holder, around a gear shift lever, in some covered storage compartment, or other inconvenient or inaccessible location.

The placement of electronic devices in automotive cup holders is reflected in U.S. Pat. No. 7,099,467, issued to Matthew Rohrbach on Aug. 29, 2006, wherein an insert is positionable into the top of the cup holder. The insert is formed with a receptacle in which an electronic device, such as a digital music player, can be inserted for support thereof in the automobile. Adapting sleeves are disclosed to permit the insert to fit in a variety of differently sized cup holders. A similar device is disclosed in U.S. Pat. No. 7,099,466, granted on Aug. 29, 2006, to Sean Walsh wherein the insert has a pair of flexible members that resiliently deform to fit into the interior of an automotive cup holder. The insert has an upwardly extending pedestal on which a cell phone or other electronic device can be detachably mounted.

Other devices for mounting a cell phone from structure on the interior of an automobile other than the cup holder are also provided in U.S. Pat. No. 6,491,194, granted on Dec. 10, 2002, to Ernest Marvin wherein a sleeve-like device is detachably mounted to the dash or other solid surface by an adhesive strip or by hook and loop fastener strip. The cell phone is slidable into the holding sleeve to be retained within the device in a convenient location until needed. In U.S. Pat. No. 5,568,549, granted to Chin-Yang Wang on Oct. 22, 1996, a similar sleeve-like device is mounted on the end of a deformable connector member that is attached to a base member equipped with suction cups for attachment of the device to a smooth, solid surface, such as the interior surface of the windshield of an automotive vehicle.

Other detachable devices have been provided for holding miscellaneous articles, such as eyeglasses, pens or pencils, with a device detachably mounted on the surface of an automotive vehicle. U.S. Pat. No. 5,484,066, issued to Thomas Luisi on Jan. 16, 1996, discloses an object holder formed with a plurality of semi-circular members that are deformable to snuggly support a generally cylindrical object such as a pen or pencil. The clip members are formed in different sizes to be engaged with differently sized objects. U.S. Pat. No. 6,564,432, granted on May 20, 2003, to Robert Kushner, teaches a clip-on device for supporting personal articles, such as eyeglasses. This device is detachably mounted by clipping onto an automotive sun visor or by an adhesive strip attaching the device to a solid surface within the interior of an automobile.

None of the above-identified prior art documents are specifically adapted for use with headpieces, although some, such as the clip-on device of U.S. Pat. No. 6,564,432, could be adapted to accomplish the task of supporting a headpiece. Nevertheless, the support of a headpiece in the clip-on device of U.S. Pat. No. 6,564,432 would not make the headpiece conveniently accessible to an occupant of the automotive vehicle as the spring-loaded device would positively clasp the personal article to prevent an easy release thereof.

It would be desirable to provide a holder that would be operable to receive and engage a headpiece for an electronic device, such as a cellular telephone, so that the headpiece could be quickly and easily accessed. It would also be desirable that the holder be capable of engagement with substantially all forms and configurations of headpieces without requiring adapters for use with specific devices. It would further be desirable that the headpiece holder be formed in a manner to be associated with a selected manner of attachment to the surface of the interior structure of the automotive vehicle.

SUMMARY OF THE INVENTION

It is an object of this invention to overcome the disadvantages of the prior art by providing a universal holder device that can be mounted on an automobile dashboard to hold telephone headpieces.

It is another object of this invention that the universal headpiece holder can be selectively mounted on an air conditioning grille louver.

It is a feature of this invention that the universal headpiece holder can be associated with different attachment members to mount the holder on selected surfaces of an automobile dashboard.

It is an advantage of this invention that the headpiece holder will permit receipt of substantially all known mobile telephone headpieces for support thereof when not in use within an automobile.

It is another advantage of this invention that the universal telephone headpiece holder can store a mobile telephone headpiece for convenient access by the operator of an automobile.

It is another feature of this invention that the receiver member can be mounted on a selected one of different attachment members for deployment at the convenience of the operator.

It is still another feature of this invention that the receiver member can be selectively removed from the attachment member for deployment with a different attachment member.

It is still another advantage of this invention that the universal telephone headpiece holder can be detachably mounted on an air conditioning louver within reach of an operator of an automotive vehicle.

It is yet another feature of this invention that the receiver member is formed in a U-shaped configuration to receive ear pieces.

It is still another feature of this invention that the receiver member is formed with a generally linear support member interconnecting the attachment member and the receiver member to provide support for telephone headpieces that have curved members that can rest thereon.

It is yet another advantage that the telephone headpiece can be stored at an elevated location on the dashboard so that the operator of the automobile does not have to divert attention from the road in order to find the telephone headpiece to talk on a mobile telephone.

It is yet another object of this invention to provide a universal telephone headpiece holder that is durable in construction, inexpensive of manufacture, carefree of maintenance, facile in assemblage, and simple and effective in use.

These and other objects, features and advantages are accomplished according to the instant invention by providing a universal mobile telephone headpiece holder that includes a U-shaped receiver member, configured to hold an earpiece, and a generally linear support member that is capable to engage a curved member on a telephone headpiece not having an earpiece to support the headpiece within convenient reach of an operator of an automobile vehicle while the headpiece is not in use. The receiver member can be configured for mounting in different attachment members to be detachable therefrom. The attachment member can be in the form of a clip engagable with an air conditioning vent grille louver or an adhesive member that is simply stuck on a flush surface of the dashboard. Through the universal telephone headpiece holder, the headpiece can be supported at an elevated location to be accessed when the phone rings without searching for the headpiece.

BRIEF DESCRIPTION OF THE DRAWINGS

The advantages of this invention will become apparent upon consideration of the following detailed disclosure of the invention, especially when taken in conjunction with the accompanying drawings wherein.

DETAILED DESCRIPTION OF THE PREFERRED EMBODIMENT

Referring to FIGS. 1-4, a universal holder for the headpiece of an electronic device, such as a cellular telephone, incorporating the principles of the instant invention, can best be seen. The holder 10 is preferably detachably connected to the surface on the interior of an automobile A and can be affixed through an adhesive strip or a strip of hook and loop fastener that will permit the holder 10 to be mounted in a temporary manner on a solid surface of the interior. Alternative mounting configurations would also include a suction cup that will adhere to a smooth solid surface, such as the interior surface of the front windshield of the automobile, or a mounting clip, described in greater detail below, that will enable the holder 10 to be temporarily attached to the louver of an air conditioning vent in the automobile.

The holder 10 has two portions, an attachment portion 12 and a headpiece receiving apparatus 20. The attachment portion 12 can be formed in any one of the configurations noted above such that the receiving apparatus 20 is supported at an elevated position on the automotive vehicle 5. In FIGS. 1-4, the attachment portion 12 is formed as a mounting clip 15 that has an upper leg 16 and an opposing lower leg 17 that are spaced apart sufficiently to receive the thickness of an air conditioning vent louver 7 therebetween. Preferably, each leg 16, 17 is formed with a convoluted or textured grip surface to enhance the engagement between the smooth surface of the vent louver 7 and the leg 16, 17, including a nodule 18 at the distal end of at least one of the legs 16, 17 to slip behind the louver 7 to help secure the mounting clip 15 to the louver 7. The legs 16, 17 are preferably pivotally connected together and interengaged with a spring 19 that will exert a biasing force on the legs 16, 17 toward one another and effect a gripping of the air conditioning vent louver 7.

Figure 5:
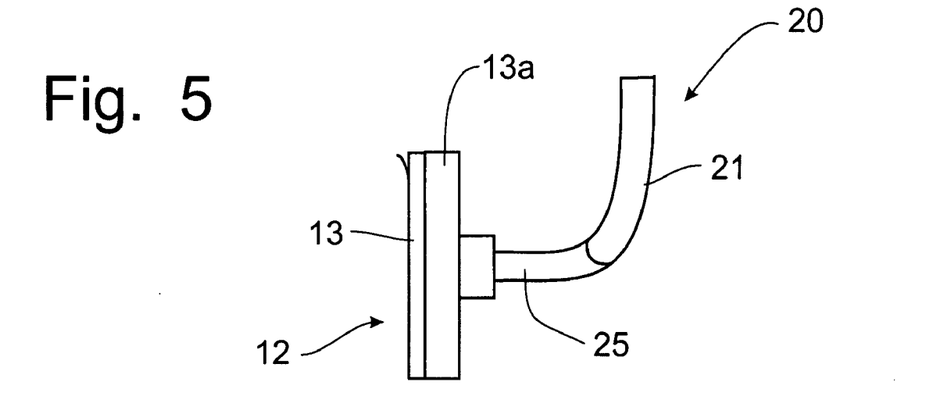
FIG. 5 is a side elevational view of the universal headpiece holder having a alternative embodiment of an attachment member for mounting the headpiece holder.
Figure 6:
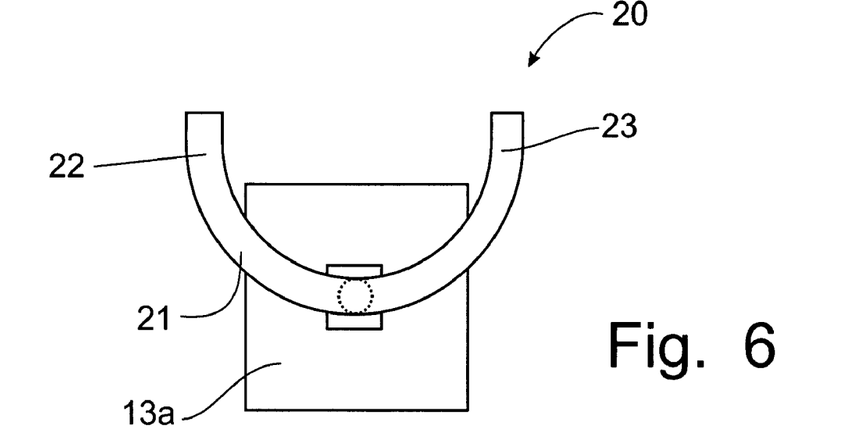
FIG. 6 is a front elevational view of the universal headpiece holder shown in FIG. 5.
Figure 7:
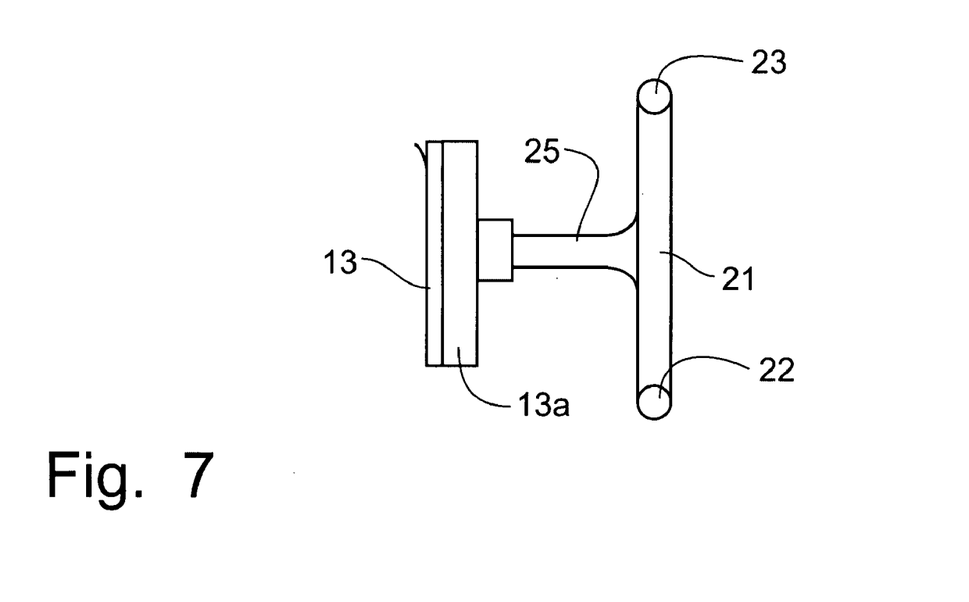
FIG. 7 is a top plan view of the universal headpiece holder shown in FIG. 6.

An alternative fastening portion 12 is depicted in FIGS. 5-7. The fastening portion 12 has mounting block 13a on which is secured a foam adhesive strip 13 for adhering to a substantially flat surface on the interior of the automobile, such as a vertically oriented surface of the automotive dash. The receiving apparatus 20 is substantially the same as is described below with respect to the mounting clip 15 embodiment and the operation of the receiving member 21 is the same. Only the means for mounting the universal headpiece holder 10 is different. One skilled in the art will recognize that other fastening devices can be utilized, including a suction cup (not shown), and that some fastening devices provide greater flexibility in positioning the holder 10 than others, as well as a greater flexibility in detaching and repositioning the holder 10.

Figure 1:
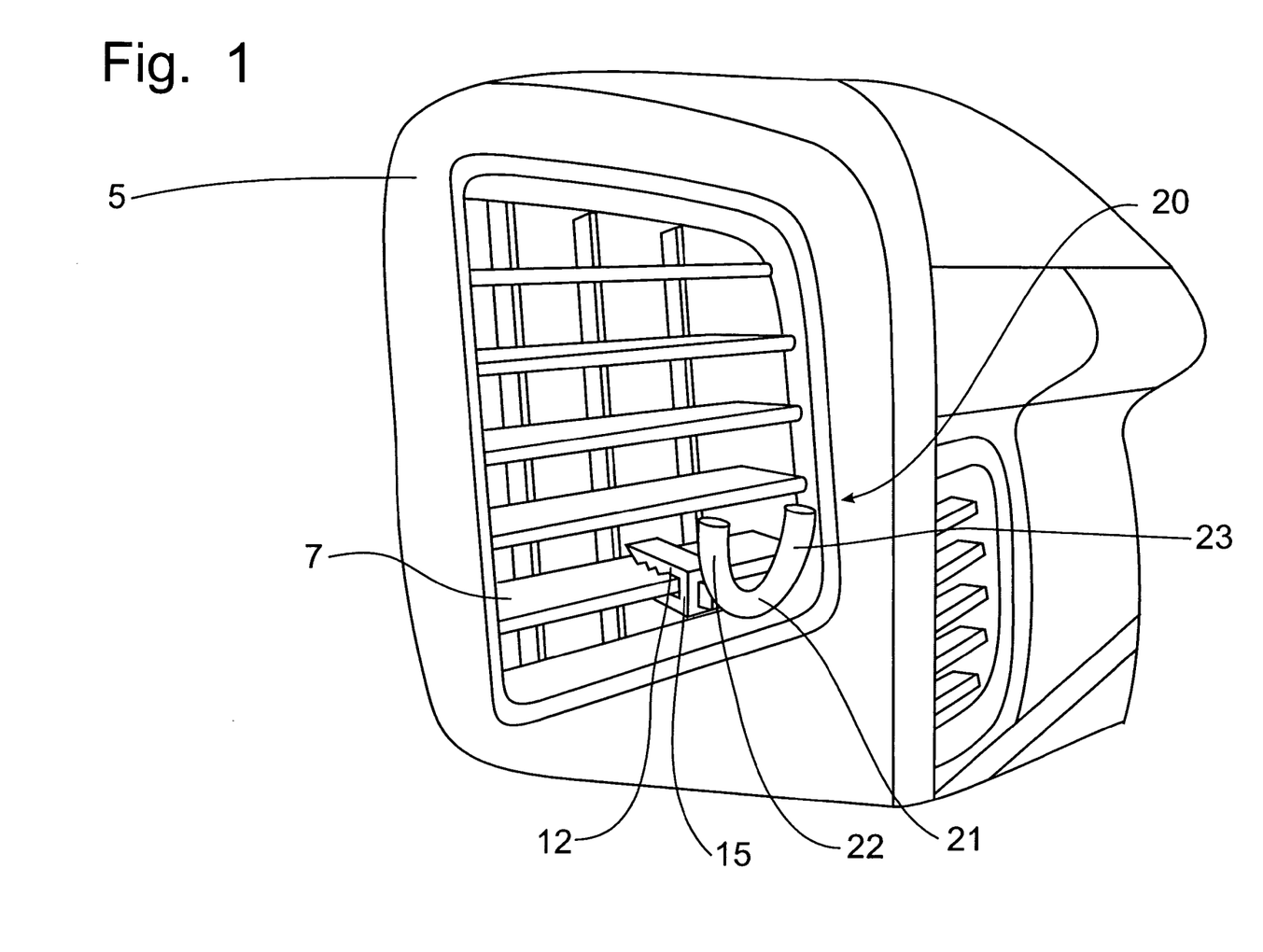
FIG. 1 is a partial front perspective view of a automobile dashboard on which is mounted a universal headpiece holder incorporating the principles of the instant invention, the headpiece holder is depicted provided with a first preferred attachment device, namely a clip for mounting on a louver of an air conditioning vent on the vehicle dashboard.
Figure 2:
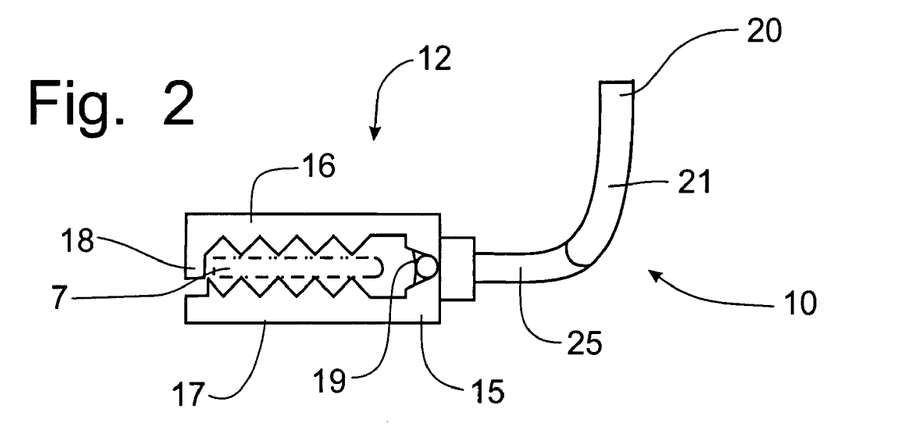
FIG. 2 is a side elevational view of the universal headpiece holder shown in FIG. 1, the louver of the air conditioning vent being shown in phantom.
Figure 3:
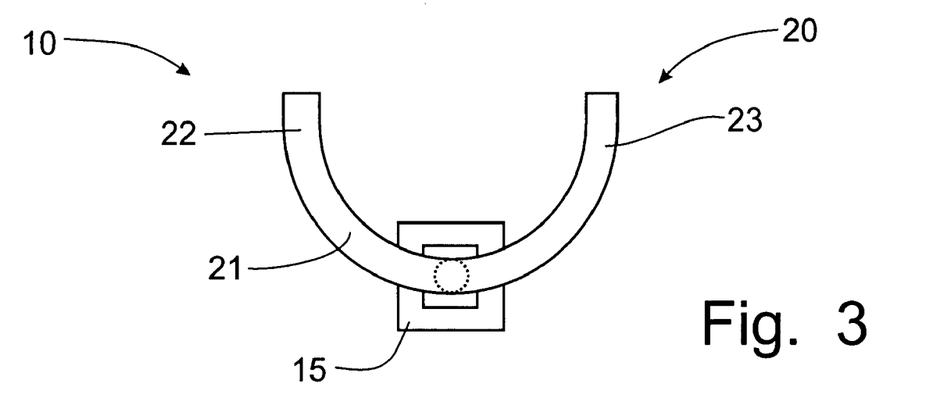
FIG. 3 is a front elevational view of the universal headpiece holder shown in FIG. 2.
Figure 4:
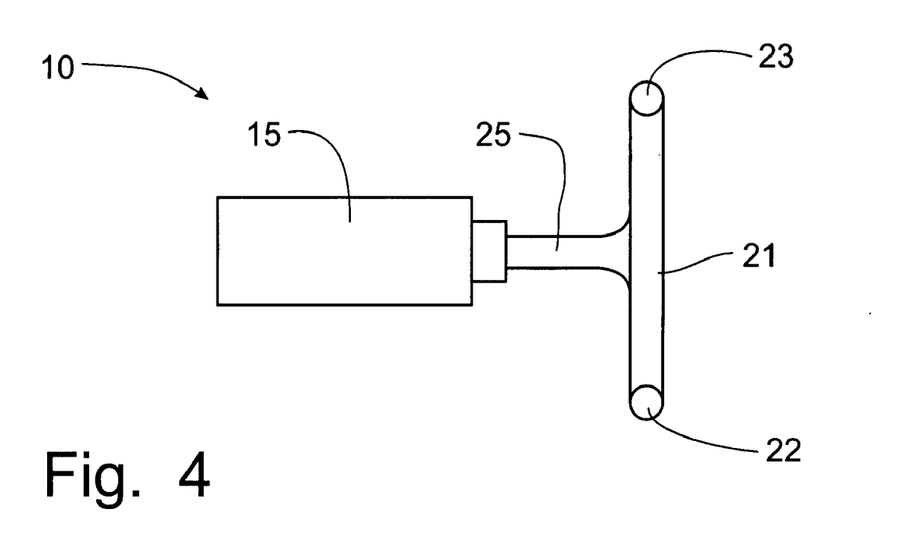
FIG. 4 is a top plan view of the universal headpiece holder shown in FIG. 1.

The receiving apparatus 20 projects outwardly from the fastening portion 12 and is formed with a receiving member 21 that includes at least one upwardly extending member 22 to engage or restrain from movement a headpiece mounted thereon. In such a configuration, the single upwardly extending member 22 could be shaped as a hook, or in an L-shaped configuration extending outwardly from the fastening portion 12 and then projecting upwardly. Preferably, however, the receiving member 21 will include a pair of laterally spaced upright members 22, 23 that define a gap or space therebetween in which a structural component of the headpiece connected to a mobile telephone (not shown) can be positioned so as to be supported at a location that is convenient for accessing as needed. The upright members 22, 23 are preferably joined at a lower portion thereof to create a U-shaped configuration, as is best seen in FIGS. 1, 3 and 6. Alternatively, the upright members 22, 23 can be joined in a V-shape.

One skilled in the art will recognize that the upright members 22, 23 can be formed from different materials, including a semi-circular, half-tube member bent or shaped into a U-shaped configuration attached to the fastening portion 12. The top ends of the upright members 22, 23 could be formed with laterally oriented and aligned grooves to facilitate an associated function, such as wrapping a cord from the headpiece to raise the cord out of the way from the operative controls of the vehicle. The preferred embodiment of the U-shaped entire receiving apparatus 20, including the receiving member 21 and the upright members 22, 23, will be formed from plastic, which can be injection molded.

Figure 8:
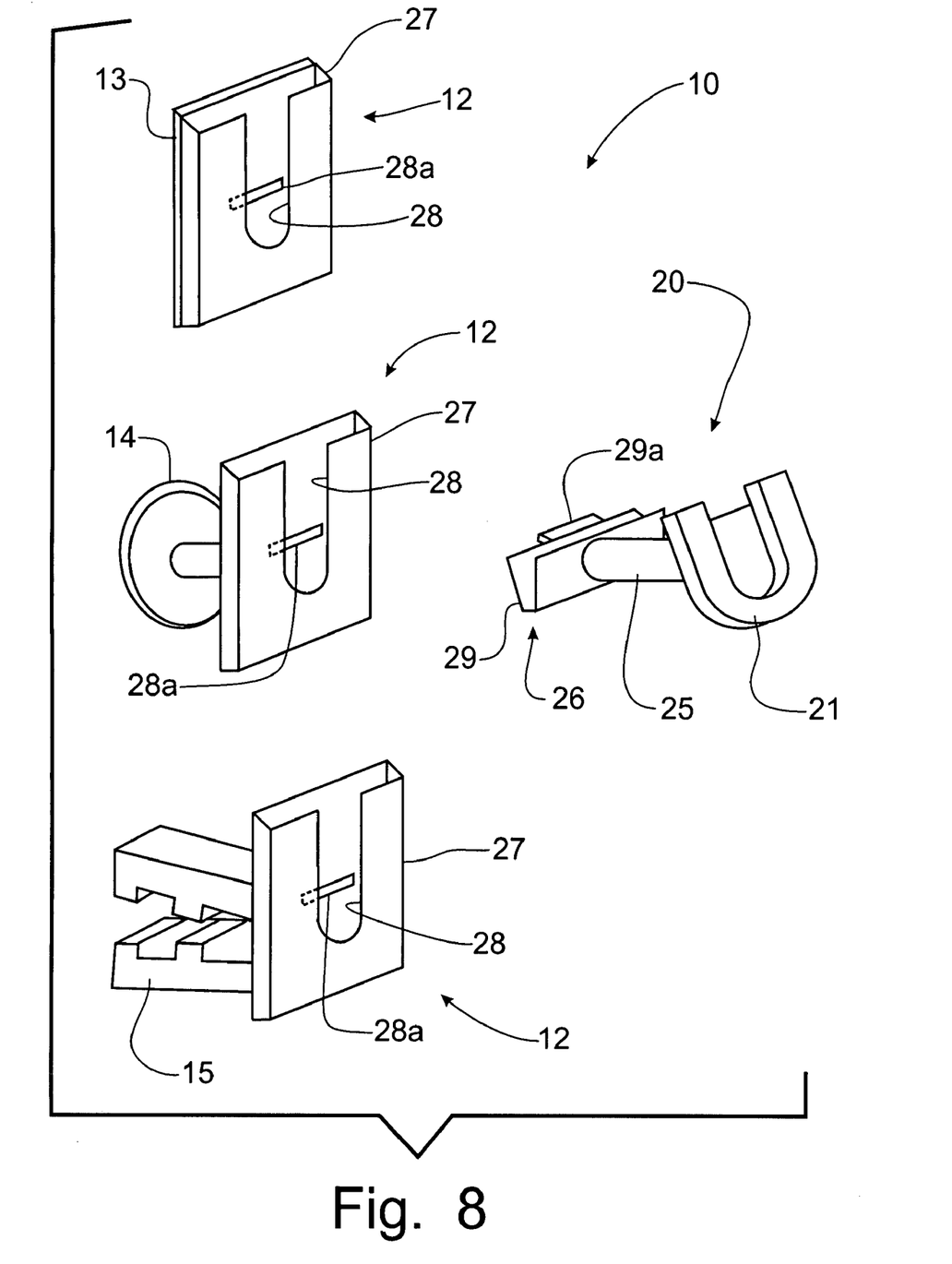
FIG. 8 is a perspective view of a configuration of the universal headpiece holder in which the receiving member is selectively attachable to one of several alternate fastening members.

Referring now to the schematic drawings in FIG. 8, the preferred connection between the fastening portion 12 and the receiving apparatus 20 can best be seen. Preferably, the receiving apparatus 20 includes a base member 25 that interconnects the receiving member 21 and the fastening portion 12. The base member 25 is formed with a connection apparatus 26 that will permit the selective attachment of a desired fastening portion 12 to the base member 25. Preferably, the holder 10 will be manufactured with the receiving apparatus 20, including the base member 25 and the receiving member 21, as an integral component, and the fastening portion 12 manufactured as separate disconnected members formed in different configurations. For example, a package containing the holder 10 could have a receiving member 21 and three different fastening portions 12, such as an adhesive fastening portion 13, a suction cup fastening portion 14, and a clip-on fastening portion 15. The purchaser of the holder 10 could then select which of the three fastening portions 12 he would want to utilize, and then attach the selected fastening portion 12 to the connection apparatus 26 on the base member 25 to assemble the completed holder 10.

Accordingly, the connection apparatus 26, as is depicted in FIG. 8, could include a spring clip 29, having a retention tab 29a, that slides into a receiver 27, preferably in the form of a channel 28 on the fastening portion 12. In the depicted configuration, the spring clip 29 deflects when placed into the channel 28 until the retention tab 29a pops into the opening 28a in the receiver 27. One skilled in the art will readily recognize that the receiver 27 and spring clip connector 29 could be reversed with the spring clip connector 29 on the fastening portion 12 and the receiver 27 on the base member 25. Furthermore, one of ordinary skill in the art will recognize that other forms of receivers and connectors are also applicable to the joining of the fastening portion 12 to the base member 25.

Examples of such alternative connecting structure would be a fastening pin (not shown) as the connector 29 having a flanged head that would yield to permit passage into an opening (not shown) formed in the base member 25 for a snug fit therebetween. Once the flanged head passed into the opening, the flanged head would spring back into the normal position and retain the fastening portion 12 on the base member 25. In such configurations, the fastening portion 12 would be permanently attached to the base member 25, while in the channel receiver 27 and connector 29, the fastening portion 12 could be removed from the base member 25 and a different configuration substituted therefor.

Referring now to FIGS. 9-15, an alternative embodiment of the universal headpiece holder 10 can best be seen. The receiving member 21 is molded in a U-shaped configuration and attached to a mounting disk 32 by a pair of laterally spaced base members 25 that provide enhanced stability to the receiving member 21. The receiving member 21 can be formed with a recess 34 defining a front pocket to assist in receiving certain headpiece configurations. The back side of the mounting disk 32 has molded onto it a mounting tab 35 that is engagable with the attachment member 12 described in greater detail below. Preferably, each of the base members 25 will be formed with a stop member 25a that limits the movement of any headpiece component resting on the base members 25 so that the headpiece is not moving back and forth in response to accelerations and decelerations of the vehicle.

Figure 9:
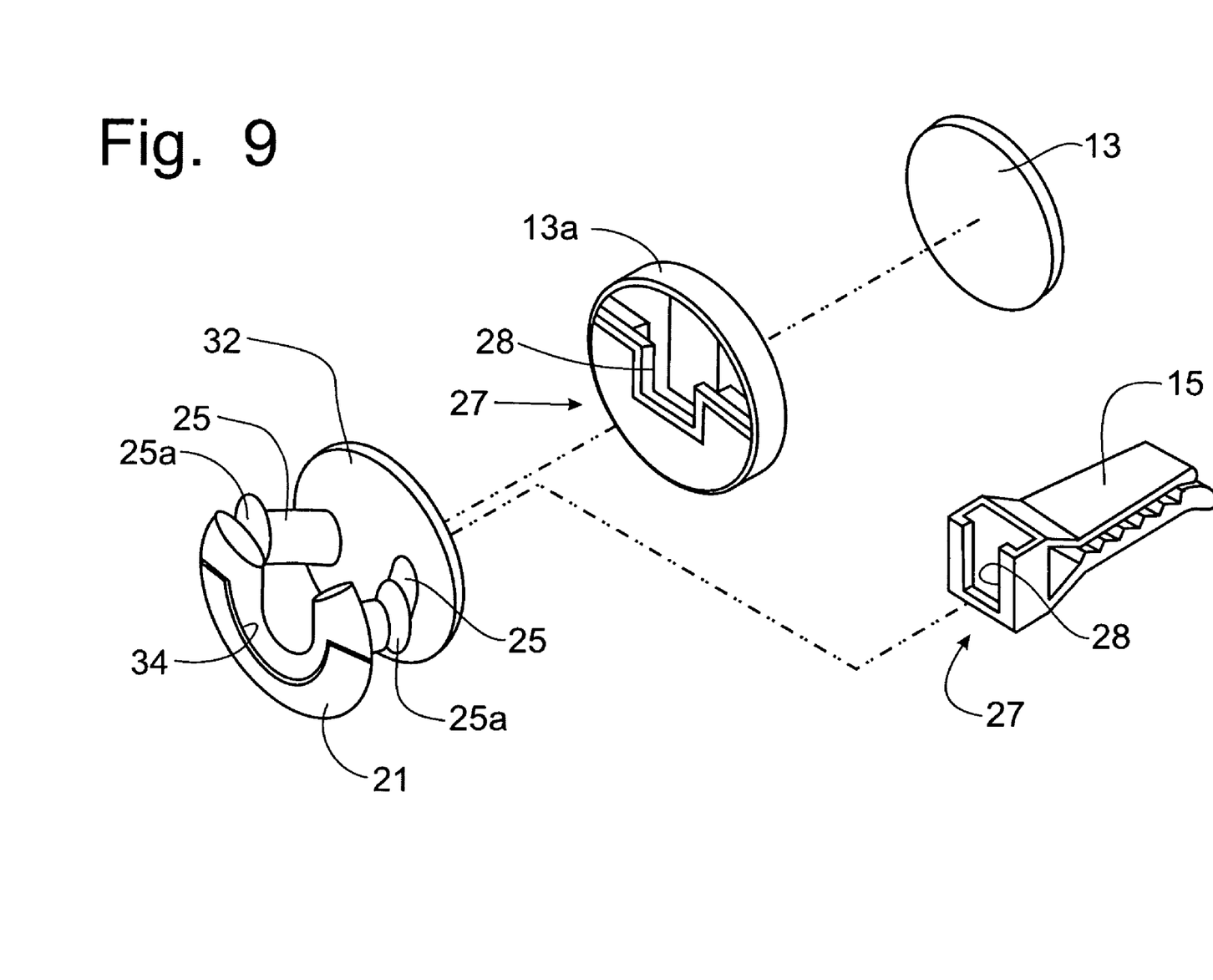
FIG. 9 is an exploded perspective view of another embodiment of the universal headpiece holder according to the principles of the instant invention.
Figure 10:
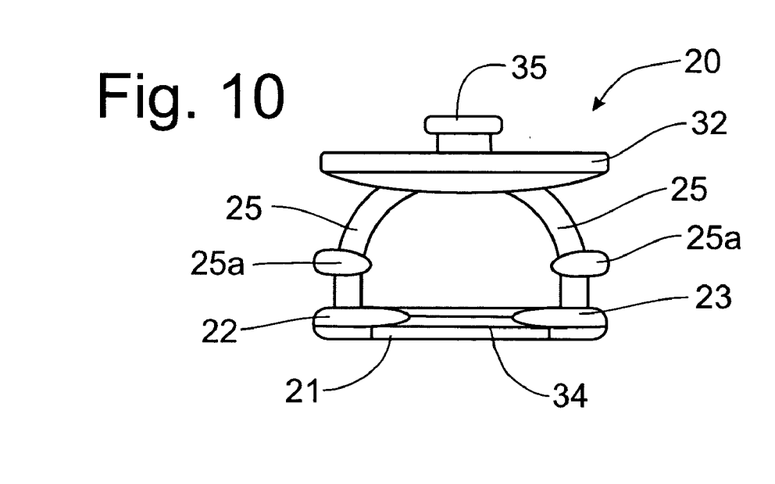
FIG. 10 is a top plan view of the receiving member shown in FIG. 9.
Figure 11:
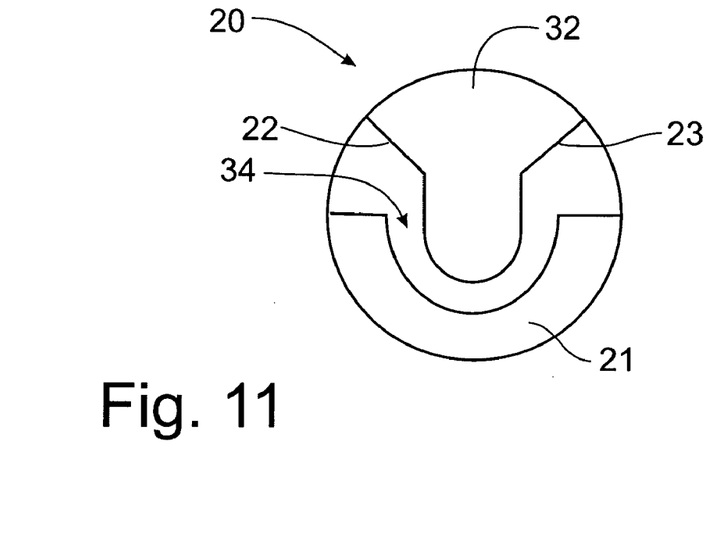
FIG. 11 is a front elevational view of the receiver member depicted in FIG. 10.
Figure 12:
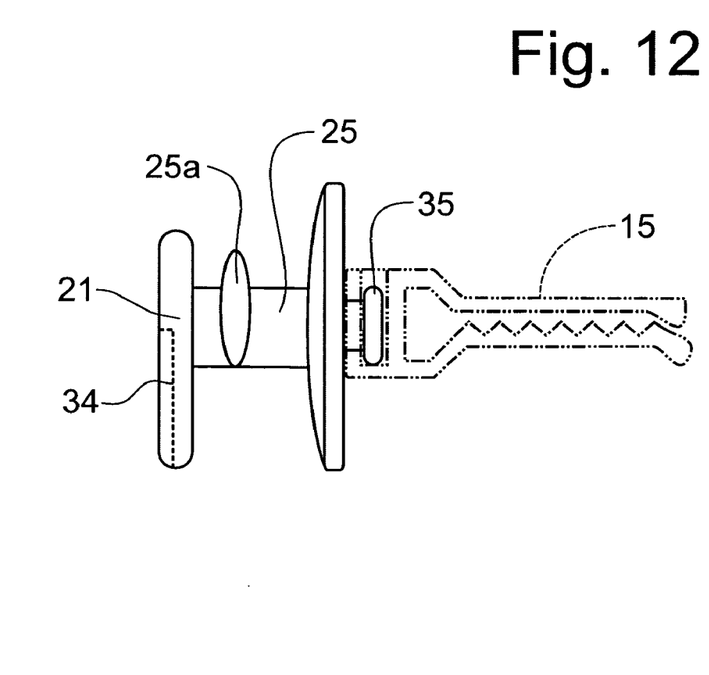
FIG. 12 is a side elevational view of the receiver member depicted in FIG. 10 with a clip member attachment device being shown in phantom.
Figure 13:
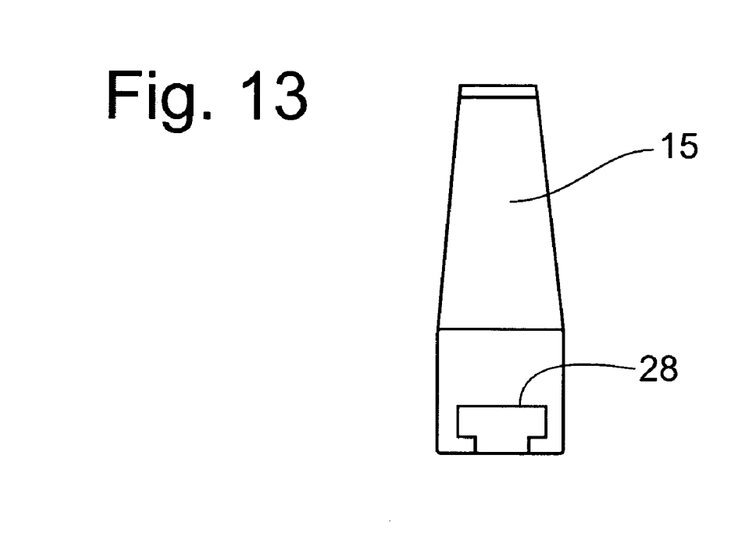
FIG. 13 is a top plan view of the clip member attachment device shown in FIG. 9.
Figure 14:
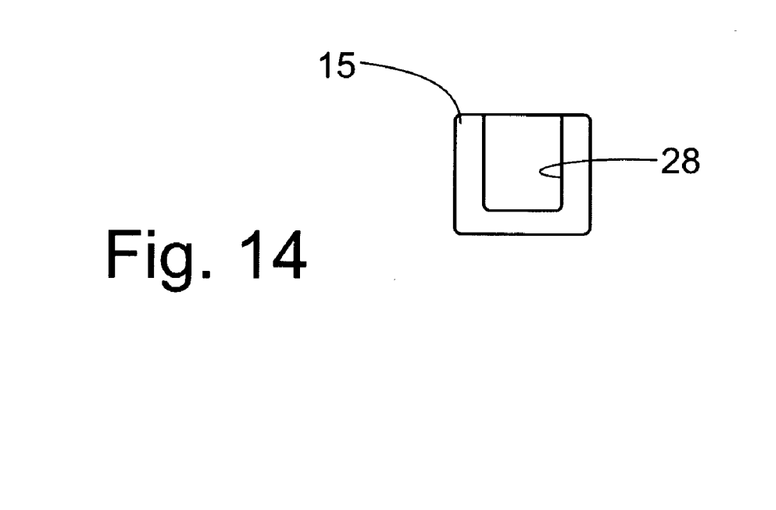
FIG. 14 is a front elevational view of the clip member depicted in FIG. 13 looking at the connection face into which the receiver member is mounted.
Figure 15:
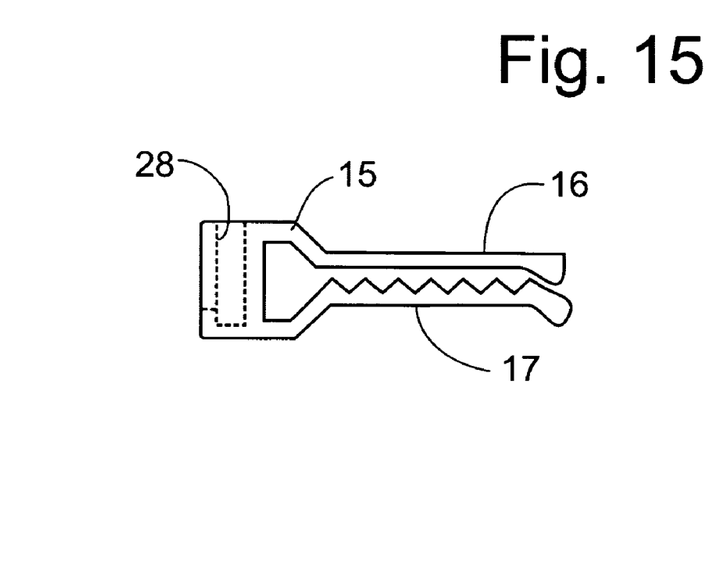
FIG. 15 is a side elevational view of the clip member depicted in FIG. 13.

FIG. 9 depicts alternate forms of attachment members 12, as are described above. Although only the adhesive member 13 and the mounting clip 15 are depicted, other forms of an attachment member, such as a suction cup, are also within the scope of the invention. Each of the alternative attachment members 12 are formed with a receiver channel 28 into which the mounting tab 35 is engaged. Each of the receiver channels 28 are formed substantially identically and define a slot into which the mounting tab 35 fits snuggly so that the receiving apparatus 20 is stable when supported on the attachment member 21. The clip member 15 is shown is greater detail in FIGS. 13-15.

The use of the holder 10 can accommodate the storage of a Bluetooth® form of a headpiece having an ear mounting member that can be received on the base member 25 with the receiver member 21 preventing the ear mounting member from sliding off the base member 25. When the user desires to access the headpiece, he simply reaches to the holder 10, grasps the headpiece and lifts the ear mounting member off the base member 25 and over the receiver member 21 to disengage the headpiece from the holder for use as desired.

A different configuration of a headpiece having a foam covered speaker member that fits on the ear of the user can also be mounted on the holder 10. The receiver member 21 cradles the foam covered speaker member between the two upright members 22, 23 to restrain the headpiece on the holder 10. Since the center of gravity of the headpiece would be below the receiver member 21, the foam covered speaker member will stay mounted in the receiver member 21. To remove the headpiece from the holder 10, the user must simply grasp the headpiece and lift the speaker member above the cradle formed by the receiver member 21 to free the headpiece for use as needed.

The holder 10 is designed for engagement with substantially every known form of a headpiece to provide a universal support member for all forms of headpieces. The receiver member 21 can directly receive some component of the headpiece, such as a headpiece having a foam covered speaker member, or serve as a retainer member to prevent an engaged headpiece from sliding off the base member 25, such as with the Bluetooth® form of a headpiece. The provision of different fastening portion configurations also provides substantial flexibility in where the holder 10 can be mounted. Accordingly, the holder 10 can be mounted on an interior surface of the automobile to conform to and provide the greatest convenience of the user of the headpiece. Furthermore, the provision of a detachable apparatus for mounting the holder 10, such as by re-adhering the adhesive fastening portion 14 to another surface, or re-locating the mounting clip 15 to a different position, allows the holder 10 be positioned and re-positioned at the whim of the user to maximize convenience in usage.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention.

For example, one skilled in the art will readily recognize that the upright members 22, 23 could be formed of frangible plastic so that the receiver member will safely disintegrate upon impact. Furthermore, the upright members 22, 23 could be covered with a foam or soft material to soften the engagement between the headpiece and the receiver member 21 and to provide a greater frictional engagement therebetween.

Having thus described the invention, what is claimed is:

1. An apparatus for supporting a headpiece for a mobile telephone on an interior surface of an automotive vehicle, the apparatus comprising:
   an attachment member having a connection device for engagement with the interior surface of the automotive vehicle, said attachment member further having a slot formed in one end thereof to be located forwardly of the connection device;
   a receiver member detachably mountable to said attachment member for support of the headpiece, said receiver member including a mounting member having a mounting tab engagable with the slot in said attachment member:
   a base member having a pair of support arms projecting outwardly from the mounting member; wherein each support arm includes a stop member, each stop member having a circumference greater than a circumference of a respective support arm; and
   a vertically oriented generally U-shaped support member mounted on an end of the pair of support arms of said base member so as to define a gap between said U-shaped support member and the mounting member, said U-shaped support member having a pair of laterally spaced upright arms interconnected by a lower transverse portion and defining an opening between the upright arms for receiving the telephone headpiece therebetween, the transverse member retaining the telephone headpiece between the upright arms.

2. The apparatus of claim 1, wherein the connection device is one of an adhesive member, a suction cup member, and a mounting clip.

3. The apparatus of claim 1, wherein the connection device is a clip member that includes upper and lower legs operable to grasp an object therebetween, the upper and lower legs being spring-loaded toward one another to assert a gripping force.

4. The apparatus recited in claim 1, wherein the mounting member, the mounting tab, the pair of support arms and the vertically oriented U-shaped support member are formed from a molded construction.

5. The apparatus of claim 1 wherein the mounting tab is releasable from the slot to permit said receiver member to be separated from said attachment member.

6. The apparatus of claim 5, wherein each stop member on each support arm is spaced between the mounting member and the U-shaped support member.

7. An apparatus for supporting a headpiece for a mobile telephone on an interior surface of an automotive vehicle, the apparatus comprising:
   an attachment member having a connection device for engagement with the interior surface of the automotive vehicle; and
   a receiver member connected to said attachment member for support of the headpiece, said receiver member including:
   a pair of support arms extending forwardly from said attachment member;
   a U-shaped support member mounted on said support arms so as to be spaced forwardly of said attachment member, said U-shaped support member having a pair of upright arms interconnected by a lower transverse portion and defining an opening between the upright arms;
   a stop member on each said support arm intermediate of said U-shaped support member and said attachment member to define a space between each stop member and said U-shaped support member, the space dimensioned to receive a portion of the headpiece; wherein each stop member has a circumference greater than a circumference of a respective support arm; and
   wherein the support arms support the headpiece when inserted into the space between said attachment member and said U-shaped support member.

8. The apparatus of claim 7, wherein said U-shaped support member includes a recess defining a front pocket for receipt of a portion of said the telephone headpiece.

9. The apparatus of claim 7, wherein the connection device is one of an adhesive member, a suction cup member, and a mounting clip.

10. The apparatus of claim 9, wherein the connection device is a clip member that includes upper and lower legs operable to grasp an object therebetween, the upper and lower legs being spring-loaded toward one another to assert a gripping force.

11. A holder for supporting a headpiece for a mobile telephone on an interior surface of an automobile vehicle, the holder comprising:
   a mounting member;
   means fitted to a first side of the mounting member for removably attaching the mounting member to an interior surface of an automobile with the mounting member positioned in a generally vertical plane;
   a pair of spaced support arms fitted to and extending generally laterally from a second side of the mounting member opposite the first side;
   a support member fitted to the extremities of the support arms, the support member spaced from the mounting member; and
   a pair of stop members each along and extending above a corresponding one of the support arms, both stop members extending in a common plane that is generally parallel with and spaced from the plane of the mounting member; wherein each stop member has a circumference greater than a circumference of a respective support arm.

12. The holder recited in claim 11, wherein the mounting member, the support arms, the support member and the stop members are molded together.

* * * * *